(12) United States Patent
Pan

(10) Patent No.: US 9,934,741 B1
(45) Date of Patent: Apr. 3, 2018

(54) ACTIVE DEVICE ARRAY SUBSTRATE AND METHOD FOR INSPECTING THE SAME

(71) Applicant: Au Optronics Corporation, Hsinchu (TW)

(72) Inventor: Ying-Hao Pan, Taoyuan (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 15/821,768

(22) Filed: Nov. 23, 2017

Related U.S. Application Data

(62) Division of application No. 14/664,911, filed on Mar. 22, 2015, now Pat. No. 9,858,877.

(30) Foreign Application Priority Data

Jan. 23, 2015 (TW) .............................. 104102318 A

(51) Int. Cl.
*G09G 3/36* (2006.01)
*G02F 1/13* (2006.01)
*G09G 3/00* (2006.01)

(52) U.S. Cl.
CPC ......... *G09G 3/3648* (2013.01); *G02F 1/1309* (2013.01); *G09G 3/006* (2013.01); *G09G 2300/043* (2013.01); *G09G 2300/0426* (2013.01); *G09G 2330/10* (2013.01); *G09G 2330/12* (2013.01)

(58) Field of Classification Search
CPC ..................................................... G09G 3/006
See application file for complete search history.

(56) References Cited

U.S. PATENT DOCUMENTS

| 5,235,272 | A | * | 8/1993 | Henley | ............. | G02F 1/136259 |
| | | | | | | 324/537 |
| 5,473,452 | A | * | 12/1995 | Shin | ...................... | G02F 1/1309 |
| | | | | | | 349/139 |
| 2006/0050194 | A1 | * | 3/2006 | Lee | ........................ | G02F 1/1362 |
| | | | | | | 349/54 |
| 2007/0290187 | A1 | * | 12/2007 | Lu | ..................... | G02F 1/136259 |
| | | | | | | 257/9 |
| 2010/0014030 | A1 | * | 1/2010 | Lin | ........................ | G02F 1/1345 |
| | | | | | | 349/84 |
| 2011/0109863 | A1 | * | 5/2011 | Liu | ................... | G02F 1/136259 |
| | | | | | | 349/143 |
| 2012/0262184 | A1 | * | 10/2012 | Shen | ...................... | G09G 3/006 |
| | | | | | | 324/537 |

(Continued)

*Primary Examiner* — Priyank Shah
(74) *Attorney, Agent, or Firm* — JCIPRNET

(57) ABSTRACT

An active device array substrate is provided. The active device array substrate includes multiple pixel structures, a drive circuit, multiple signal lines and a control line. The pixel structures are disposed in a display area. The drive circuit is disposed outside the display area. The signal lines are electrically connected to the drive circuit and the pixel structures corresponded to the signal lines. The control lines are intersected with the signal lines. A method adapted for inspecting defects on the active device array substrate is also provided. First, a tested signal line is selected from the signal lines, and the control line and the tested-signal line are conducted. Second, a test signal is input from the control line to the tested-signal line to determine a location of a defect. Finally, the control line and the tested signal line are isolated.

12 Claims, 9 Drawing Sheets

(56) References Cited

U.S. PATENT DOCUMENTS

| | | | |
|---|---|---|---|
| 2014/0070835 A1* | 3/2014 | Wen | G01R 31/2851 |
| | | | 324/760.02 |
| 2015/0022513 A1* | 1/2015 | Kim | G09G 3/3225 |
| | | | 345/212 |
| 2015/0144915 A1* | 5/2015 | Lee | G02F 1/1309 |
| | | | 257/40 |
| 2016/0041412 A1* | 2/2016 | Lv | G02F 1/1309 |
| | | | 324/760.02 |
| 2016/0109990 A1* | 4/2016 | Chang | G06F 3/0412 |
| | | | 345/173 |

* cited by examiner

ACTIVE DEVICE ARRAY SUBSTRATE AND METHOD FOR INSPECTING THE SAME

CROSS-REFERENCE TO RELATED APPLICATION

This application is a divisional of and claims priority benefit of U.S. patent application Ser. No. 14/664,911, filed on Mar. 22, 2015, now allowed, which claims the priority benefit of Taiwan application serial no. 104102318, filed on Jan. 23, 2015. The entirety of the above-mentioned patent application is hereby incorporated by reference herein and made a part of this specification.

BACKGROUND

Technical Field

The invention relates to a device array substrate and a method for inspecting the same, and particularly relates to an active device array substrate adapted to a display panel and a method for inspecting the same.

Related Art

Liquid crystal display panel is mainly composed of an active device array substrate, a color filter array substrate and a liquid crystal layer, where the active device array substrate includes a plurality of signal lines and a plurality of pixels arranged in an array, and the pixels are respectively connected to the corresponding signal lines. Generally, in order to avoid increasing a manufacturing cost, the industry trends to first inspect an accurate position where a common line and the signal line are shorted after a thin-film transistor array is fabricated, and then repairs the defect. Moreover, when the panel is designed, a technique of directly fabricating a gate driving circuit on the active device array substrate to replace an external driving chip is referred to as a gate on array (GOA) technique. However, when a short position of the GOA-type active device array substrate is inspected, it often has problems of a low detection rate and inapparent image. Particularly, taking an infrared heating location detection as an example, the problem of inapparent image or even no image is often encountered. Moreover, since a test signal has to flow through a driving circuit around a display area before entering the display area, if intensity of the test signal is increased, the driving circuit probably withstands an excessive voltage or current to cause a damage.

SUMMARY

The invention is directed to an active device array substrate capable of inspecting a defect position in a display area without making a test signal to flow through a driving circuit and a method for inspecting the same, where the aforementioned driving circuit is, for example, a gate driving circuit or a drain driving circuit.

The invention provides an inspection method, which is adapted to detect a defect on an active device array substrate, where the active device array substrate includes a plurality of pixel structures, a driving circuit, a plurality of signal lines and a control line. The pixel structures are disposed in a display area. The driving circuit is disposed outside the display area. The signal lines are electrically connected to the driving circuit and the corresponding pixel structures. The control lines are intersected with the signal lines. In the inspection method, a tested signal line is selected from the signal lines, and the control line and the tested signal line are conducted. Then, a test signal is input to the tested signal line from the control line to determine a location of a defect. Finally, the control line and the tested signal line are isolated.

In an embodiment of the invention, the step of selecting the tested signal line from the signal lines includes determining the tested signal line corresponding to the defect through a voltage imaging measurement method.

In an embodiment of the invention, the step of inputting the test signal to the tested signal line to determine the location of the defect includes performing an infrared thermography detection to the active device array substrate, so as to determine the location of the detect according to obtained infrared thermography information.

In an embodiment of the invention, the step of conducting the control line and the tested signal line includes welding an intersection of the control line and the tested signal line through laser, so as to form a welding point connecting the control line and the tested signal line. After the location of the defect is determined, the step of isolating the control line and the tested signal line includes following steps. A part of the tested signal line connected at two opposite sides of the welding point is removed to form a first signal line segment, a second signal line segment and a third signal line segment, where the first signal line segment is electrically connected to the driving circuit, the second signal line segment is electrically connected to the pixel structure, and the third signal line segment has the welding point, and is isolated to the first signal line segment and the second signal line segment. Then, a connection line electrically connected to the first signal line segment and the second signal line segment is formed, and the connection line is isolated to the third signal line segment.

In an embodiment of the invention, one side of the signal line has a first extending portion, one side of the control line has a second extending portion, and the first extending portion and the second extending portion are intersected to each other, so as to form the welding point after laser welding. After the location of the defect is determined, the step of isolating the control line and the tested signal line includes following steps. A part of the first extending portion connected to the welding point is removed to isolate the welding point and the signal line, and a part of the second extending portion connected to the welding point is removed to isolate the welding point and the control line.

The invention provides an active device array substrate including a plurality of pixel structures, a driving circuit, a control line and a plurality of signal lines. The pixel structures are disposed in a display area. The driving circuit is disposed outside the display area. The control line is located between the driving circuit and the display area. The signal lines are electrically connected to the driving circuit and the corresponding pixel structures, and are intersected with the control line. The signal lines include a target signal line, and the target signal line includes a first signal line segment, a second signal line segment, a third signal line segment and a connection line. The first signal line segment is electrically connected to the driving circuit, the second signal line segment is electrically connected to the corresponding pixel structure, and the third signal line segment has a welding point and is connected to the control line, and the third signal line segment are respectively isolated to the first signal line segment and the second signal line segment. The connection line is electrically connected to the first signal line segment and the second signal line segment, and the connection line is isolated to the third signal line segment.

In an embodiment of the invention, the connection line and the control line are intersected. Two ends of the connection line are respectively connected to the first signal line segment and the second signal line segment.

The invention provides another active device array substrate including a plurality of pixel structures, a driving circuit, a control line and a plurality of signal lines. The pixel structures are disposed in a display area. The driving circuit is disposed outside the display area. The control line is located between the driving circuit and the display area. The signal lines are electrically connected to the driving circuit and the corresponding pixel structures, and are intersected with the control line. One side of each of the signal lines has at least one first extending portion, one side of the control line has at least one second extending portion, and at least one of the first extending portions is intersected with the corresponding second extending portion.

In an embodiment of the invention, at least one of the signal lines is a target signal line, and the first extending portion of the target signal line and the corresponding second extending portion are intersected to form a welding point, and the welding point is not electrically connected to the driving circuit.

In an embodiment of the invention, the target signal line further has a first main body portion and a first disconnection portion, and the control line further has a second main body portion and a second disconnection portion. The welding point is electrically isolated to the first main body portion and the second main body portion through the first disconnection portion and the second disconnection portion, respectively.

According to the above descriptions, in the invention, by inputting the test signal to the tested signal line from the control line, an effect of inspecting the location of the defect in the display area is achieved without making the test signal to flow through the driving circuit, such that during the inspection, an infrared image is obvious produced without damaging the driving circuit on the substrate. Meanwhile, a defect location detection rate of a GOA-type active device array substrate is increased.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the invention, by inputting a test signal to a tested signal line from a control line, an effect of inspecting a location of a defect in a display area is achieved without making the test signal to flow through a driving circuit, such that during the inspection, an infrared image is obvious produced without damaging the driving circuit on a gate on array (GOA)-type active device array substrate. In fact, the control line of the invention is, for example, a start pulse signal line, and the start pulse signal line is originally used for providing a start pulse signal Vst, and a gate signal is generated according to the start pulse signal Vst. In other words, the test signal can be transmitted by using the existing circuit on the substrate, such that the test signal can enter pixel structures in the display area without passing through the driving circuit on the GOA-type active device array substrate, and it is unnecessary to additionally form other lines to serve as the control line. Certainly, in other embodiments, similar lines can be selected to serve as the control line, for example, a negative voltage line used for providing a negative voltage Vss to power supply terminals of all of shift registers, or a clock signal line used for providing a clock signal Vck to a clock signal terminal CK. Alternatively, in case of the absence of an applicable line, the aforementioned control line can be additionally fabricated between the driving circuit and the display area on the GOA-type active device array substrate, which is not limited by the invention.

Figure 1:
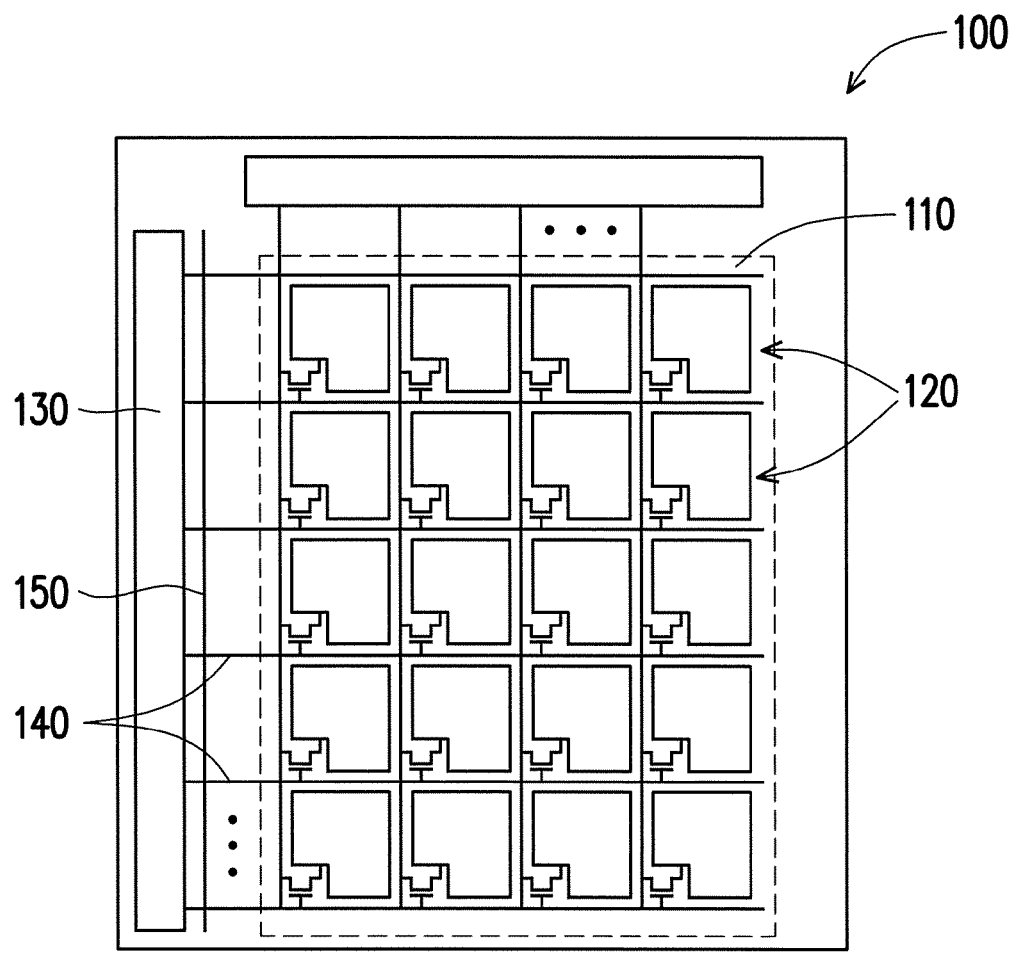
FIG. 1 is a schematic diagram of an active device array substrate according to an embodiment of the invention.

FIG. 1 is a schematic diagram of an active device array substrate according to an embodiment of the invention. An inspection method provided by the invention is adapted to detect defects on the active device array substrate. Referring to FIG. 1, the active device array substrate 100 includes a display area 110, a plurality of pixel structures 120, a driving circuit 130, a plurality of signal lines 140 and a control line 150. The pixel structures 120 are, for example, arranged in a two-dimensional array and disposed in the display area 110, and are controlled by the signal lines 140. The signal lines 140 are electrically connected to the driving circuit 130 and the corresponding pixel structures 120. The signal lines 140 can be data lines or scan lines, and in the present embodiment, the signal lines 140 are, for example, scan lines. The driving circuit 130 can be a gate circuit or a source circuit, and is disposed outside the display area 110, and in the present embodiment, the driving circuit 130 is, for example, a gate circuit. The control line 150 is located between the driving circuit 130 and the display area 110, and is intersected with and isolated to the signal lines 140.

It should be understood that in the invention, the conventional active device array substrate is taken as an example for description, and the structure thereof is not limited. Moreover, in the present embodiment, only one active device array substrate 100 is illustrated. However, those skilled in the art should understand that the inspection is generally performed to a plurality of active device arrays on a large motherboard. After the inspection is completed, the motherboard is cut in a post fabrication process, so as to form a plurality of independent active device array substrates.

Figure 2:
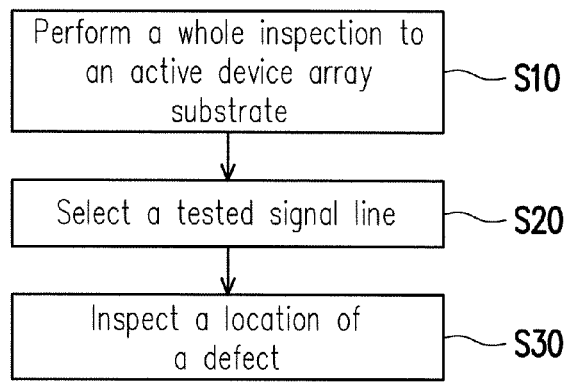
FIG. 2 is a flowchart illustrating an inspection method according to an embodiment of the invention.
Figure 3:
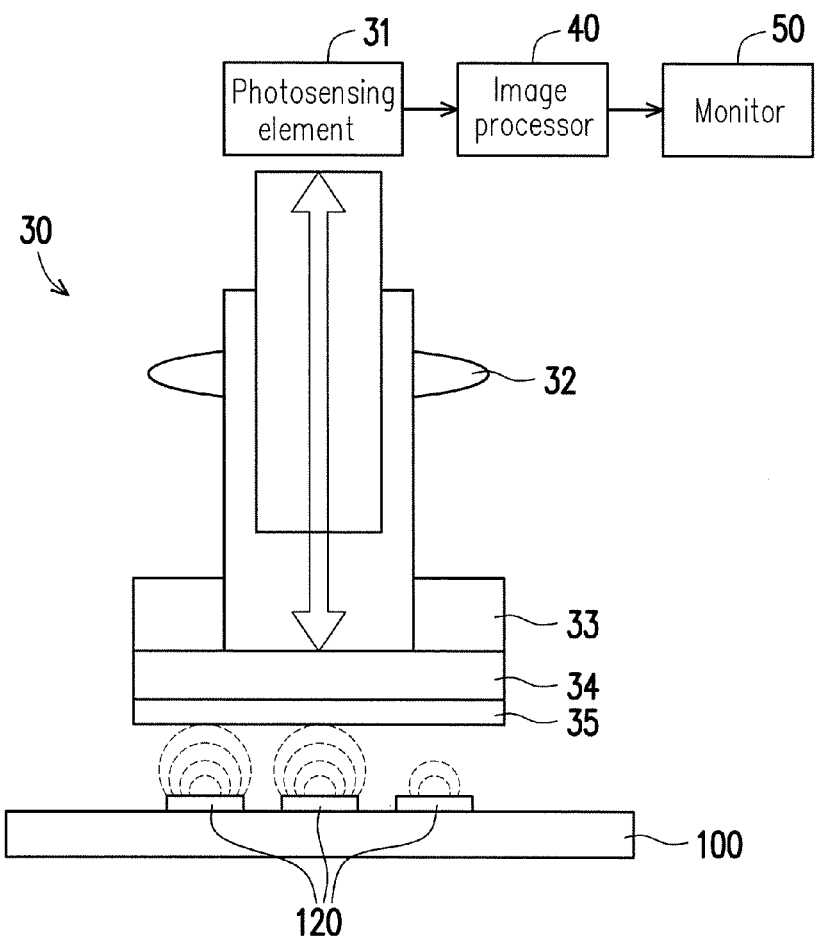
FIG. 3 is a schematic diagram of a voltage imaging inspection machine according to an embodiment of the invention.

FIG. 2 is a flowchart illustrating an inspection method according to an embodiment of the invention. FIG. 3 is a schematic diagram of a voltage imaging machine according to an embodiment of the invention. Referring to FIG. 2, according to the inspection method of the invention, in step S10, a whole inspection is first performed to the active device array substrate 100, and a method of performing the whole inspection is, for example, an optical appearance inspection method or a voltage imaging measurement method.

The optical appearance inspection method is to project light on a thin film transistor, and after a sensor inspects the reflected light, an image processing technique is applied to compare adjacent pixel patterns to determine whether the patterns are different, so as to obtain a tested signal line 140A (referring to FIG. 5A) corresponding to the defect.

The voltage imaging measurement method is a non-contact inspection technique. Referring to FIG. 3, the voltage imaging machine 30 includes a photosensing element 31, a light source 32, a modulator 33, a liquid crystal structure 34 and a reflection element 35. A principle of the voltage imaging measurement method is to use the photosensing element 31 to capture images on the reflection element 35 to acquire electric field data of different pixel structures 120. To be specific, the photosensing element 31 is, for example, a high resolution lens, and the voltage imaging machine 30 uses the modulator 33 to control an air space between the voltage imaging machine 30 and the active device array substrate 100. The pixel structure 120 with a defect may produce an electric field different to that of the other normal pixel structures 120, and in the area corresponding to the pixel structure with the defect, the liquid crystal in the liquid crystal structure 34 is influenced to have a different rotation. Then, after the reflection element 35 reflects the light, the photosensing element 31 receives different brightness. Finally, an image processor 40 processes the different brightness information to produce a monitoring picture on a monitor 50. In this way, the pixel structures 120 corresponding to the defects such as point short line, line short line and mura, etc. can be discovered, so as to learn the tested signal line 140A (referring to FIG. 5A) corresponding to the defects.

After the whole inspection is performed to the active device array substrate according to the aforementioned optical appearance inspection method or the voltage imaging measurement method, etc., the tested signal line 140A (referring to FIG. 5A) corresponding to the defect is learned. In step S20, after the tested signal line 140A (referring to FIG. 5A) is selected, in step S30, a location inspect of a defect on the tested signal line 140A (referring to FIG. 5A) is performed. The method for inspecting the location of the defect is described in detail below.

Figure 4:
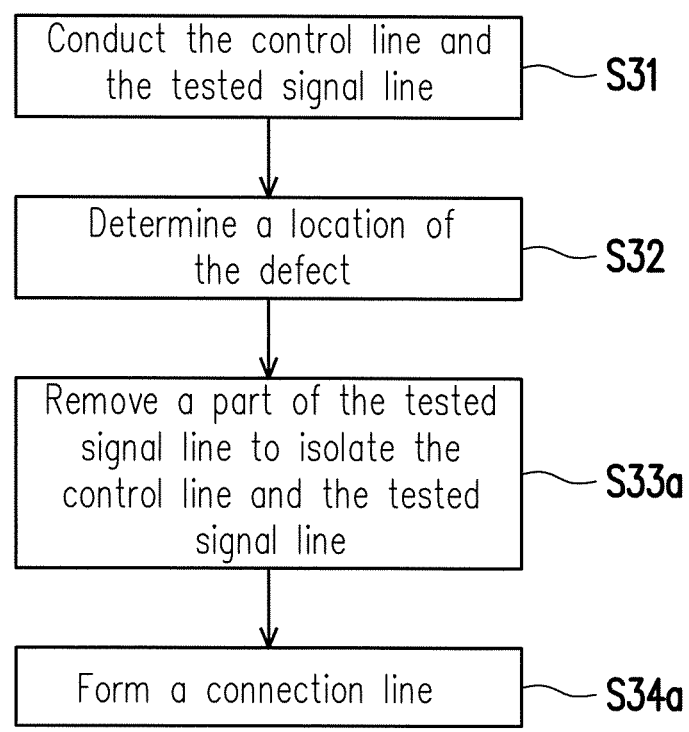
FIG. 4 is a flowchart illustrating a method for inspecting a location of a defect according to an embodiment of the invention.
Figure 5A:
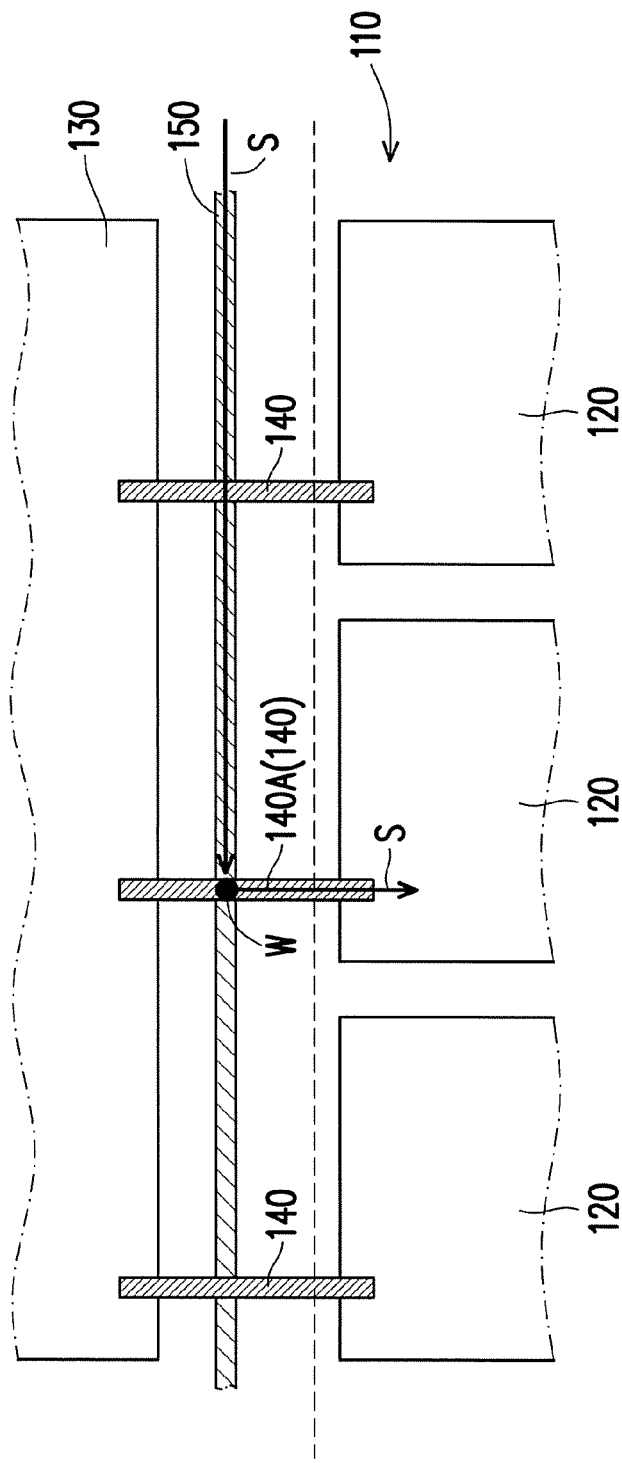
FIG. 5A to FIG. 5C are enlarged views of corresponding structures of an inspection method of the active device array substrate according to an embodiment of the invention.
Figure 5B:
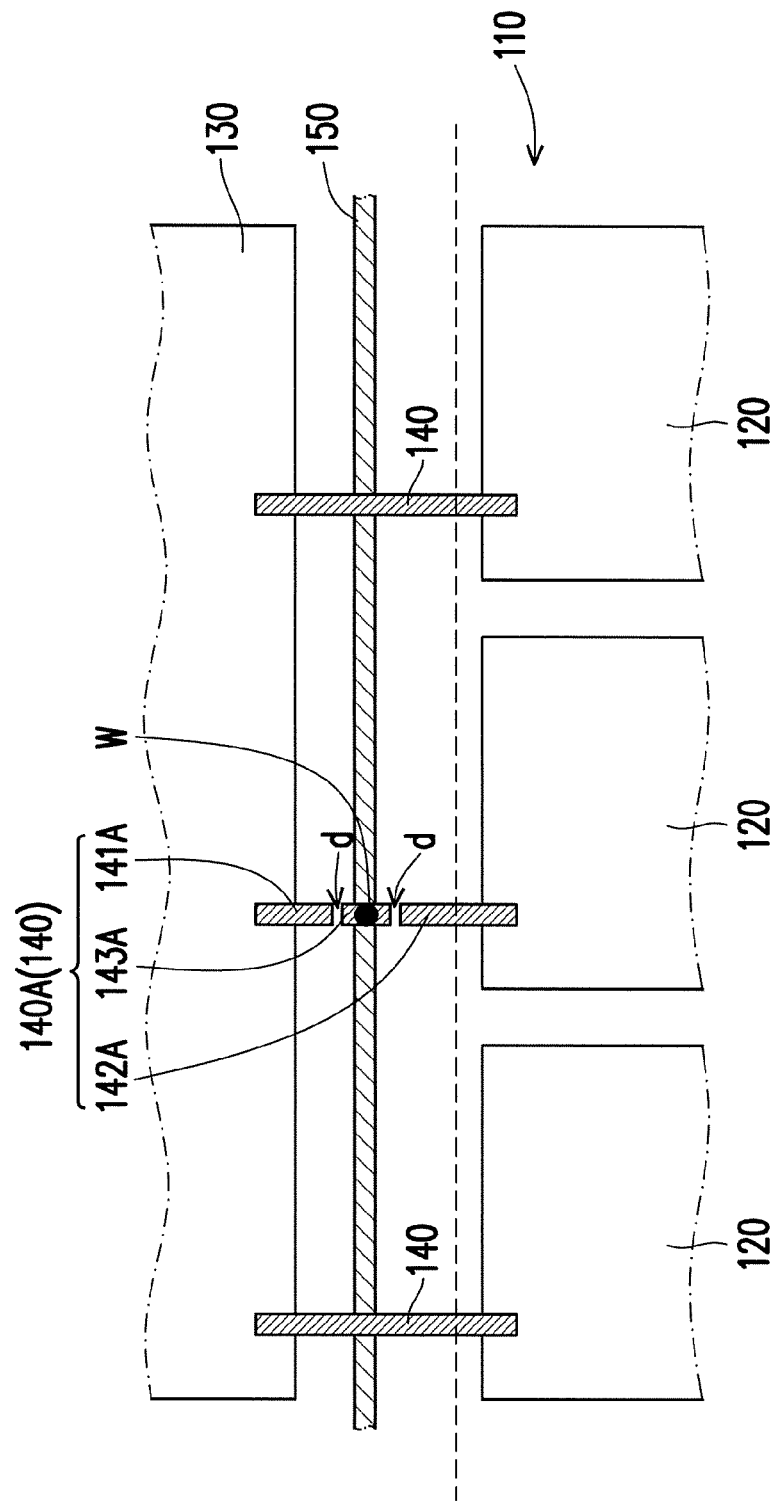
Figure 5C:
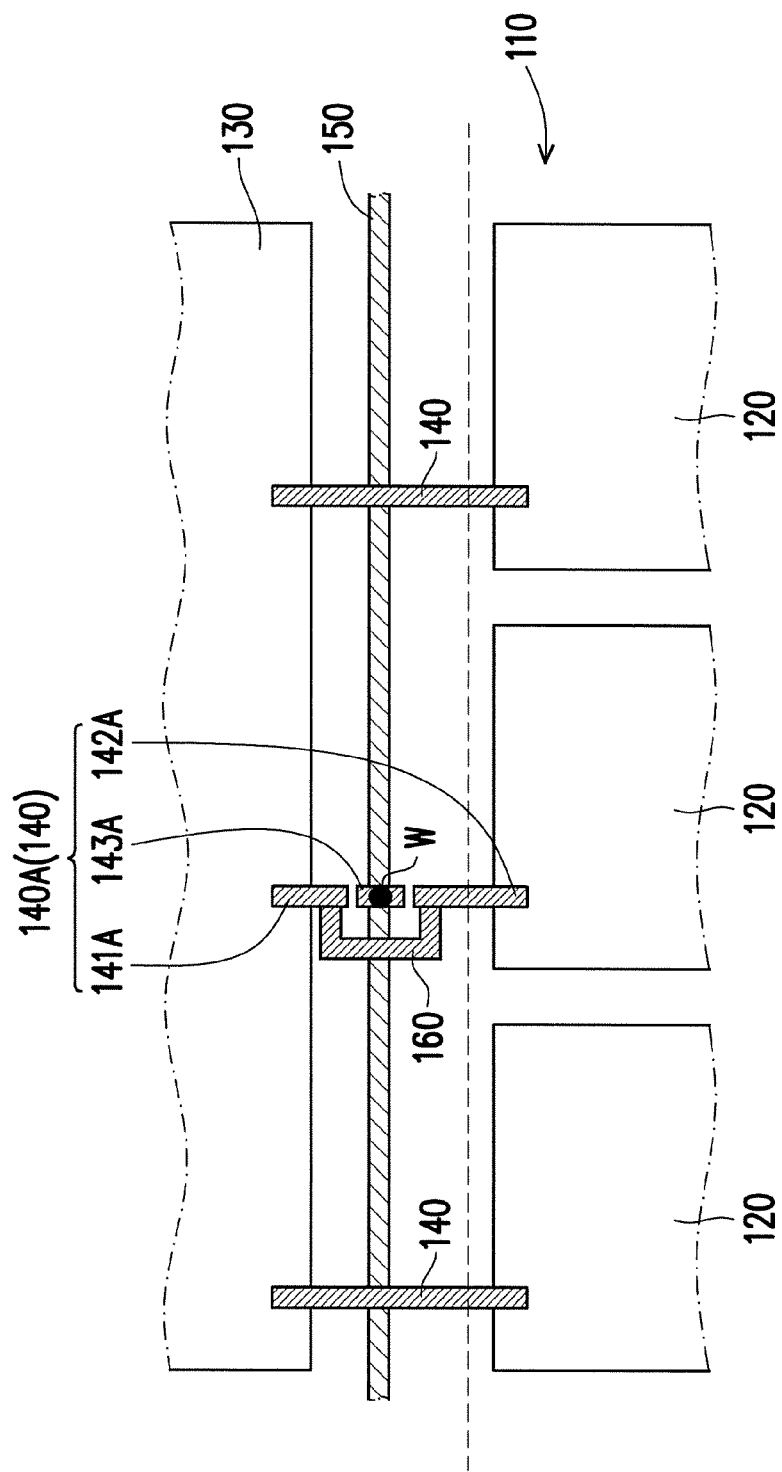

FIG. 4 is a flowchart illustrating a method for inspecting the location of the defect according to an embodiment of the invention. FIG. 5A to FIG. 5C are enlarged views of corresponding structures of the inspection method of the active device array substrate according to an embodiment of the invention. Referring to FIG. 4 and FIG. 5A, after the tested signal line 140A corresponding to the defect is determined, the location of the defect on the tested signal line 140A is further inspected. In the invention, for clarity's sake, only three pixel structures 120 and three signal lines 140 are illustrate. According to the step of FIG. 4 and as shown in FIG. 5A, when the location inspect of the defect is performed, the control line 150 and the tested signal line 140A are first conducted at an intersection of the control line 140 and the tested signal line 140A. The method for conducting the control line 150 and the tested signal line 140A can be gas welding, electric-resistance welding, electric-arc welding, induction welding, laser welding, etc. In the present embodiment, the intersection of the control line 150 and the tested signal line 140A are, for example, welded through laser, so as to form a welding point W connecting the control line 150 and the tested signal line 140A, though the invention is not limited thereto.

Then, in step S32 of FIG. 4, after the control line 150 and the tested signal line 140A are conducted, a test signal S is input to the tested signal line 140A from the control line 150 to determine a location of the defect on the pixel structure along a column direction in the figure. In other words, as shown in FIG. 5A, since the rightmost signal line 140 and the control line 150 are not conducted/electrically connected with each other, the test signal S cannot flow into the rightmost signal line 140. Moreover, when the test signal S flows to the tested signal line 140A, since the tested signal line 140A and the control line 150 are conducted through the welding point W, the test signal S can flow into the tested signal line 140A to enter the display area 110, so as to determine the location of the defect on the pixel structure along the column direction of the figure. The method of determining the location of the defect is to perform thermal imaging to the active device array substrate, so as to detect the location of the defect on the tested signal line 140A based on a characteristic that the tested signal line 140A with the defect is liable to produce heat due to a reason of short circuit or broken circuit. In the present embodiment, an infrared thermography detection is performed, so as to determine the location of the defect according to obtained infrared thermography information.

Then, according to a step S33a of FIG. 4 and as shown in FIG. 5B, after the location of the defect is determined, the control line 150 and the tested signal line 140A are isolated. A method of isolating the control line 150 and the tested signal line 140A is to remove a part of the tested signal line 140A connected at two opposite sides of the welding point W to form a first signal line segment 141A, a second signal line segment 142A and a third signal line segment 143A. The first signal line segment 141A is electrically connected to the driving circuit 130, the second signal line segment 142A is electrically connected to the pixel structure 120, where none of the first signal line segment 141A and the second signal line segment 142A has the welding point W, and the third signal line segment 143A has the welding point W, and a space d is respectively formed between the third signal line segment 143A and the first signal line segment 141A, the second signal line segment 142A for isolation. By removing a part of the tested signal line 140A connected at two opposite sides of the welding point W, a conduction state between the control line 150 and the tested signal line 140A as shown in FIG. 4A is released. In other words, after a part of the tested signal line 140A is removed, when the test signal S flows to the tested signal line 140A from the control line 140, the test signal S cannot flow into the first signal line segment 141A or the second signal line segment 142A. It should be noticed that the two spaces d between the third signal line segment 143A and the first signal line segment 141A and the second signal line segment 142A can be the same or different.

Finally, according to a step S34a of FIG. 4 and as shown in FIG. 5C, a connection line 160 electrically connected to the first signal line segment 141A and the second signal line segment 142A is formed on the active device array substrate, where the connection line 160 is isolated to the third signal line segment 143A. The connection line 160 is, for example, formed through laser chemical vapor deposition, and the signal originally transmitted through the first signal line segment 141A and the second signal line segment 142A is restored. To be specific, based on pyrolytic laser chemical vapor deposition or photolytic laser chemical vapor deposition, a focused laser beam is used for irradiating a designated surface, and a deposit is formed on the designated surface to achieve the effect of connecting the first signal line segment 141A and the second signal line segment 142A. In brief, by forming the connection line 160, the originally isolated first signal line segment 141A and the second signal line segment 142A are restored to the conduction state, such that the first signal line segment 141A connected to the driving circuit 130 can again transmit signals to the second signal line segment 142A connected to the pixel structure 120.

Figure 6:
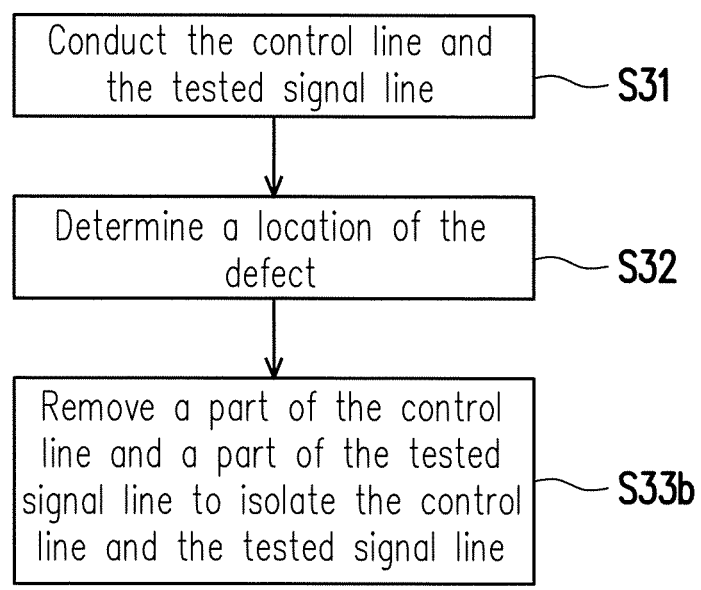
FIG. 6 is a flowchart illustrating a method for inspecting a location of a defect according to another embodiment of the invention.
Figure 7A:
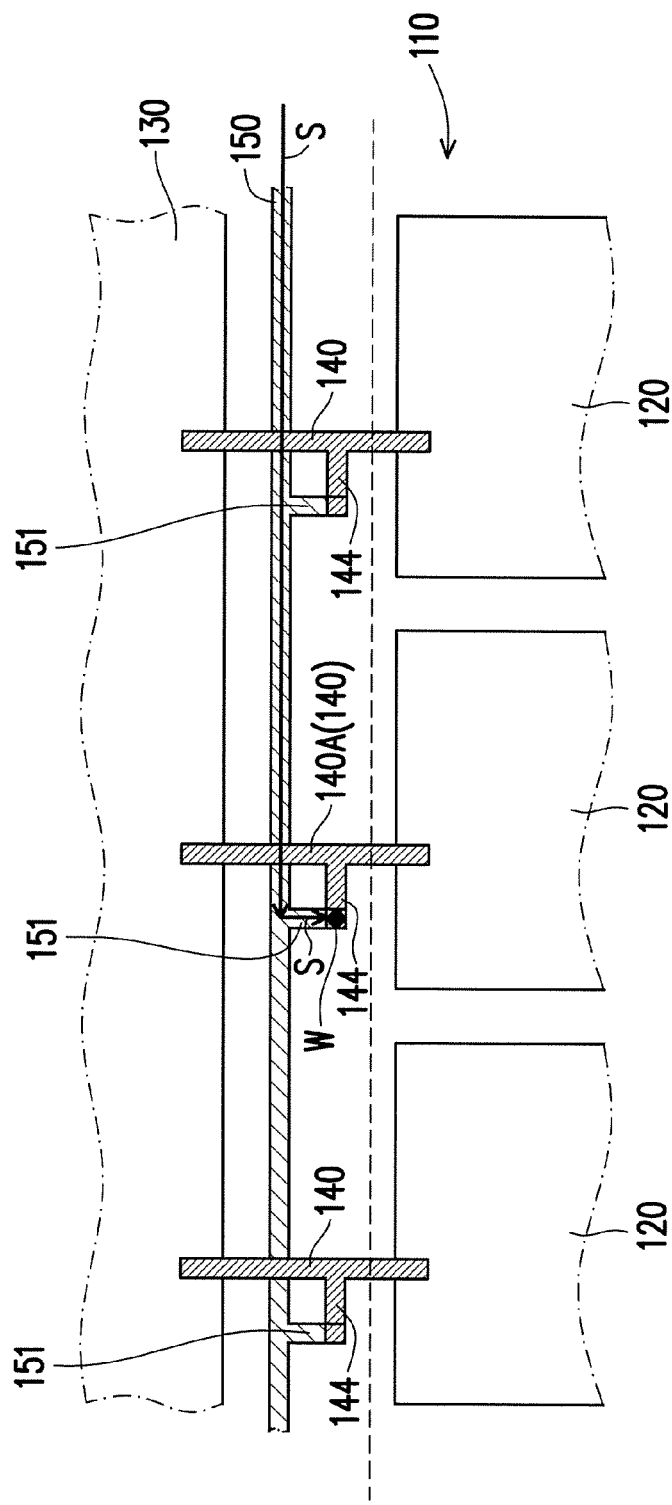
FIG. 7A and FIG. 7B are enlarged views of corresponding structures of an inspection method of the active device array substrate according to another embodiment of the invention.
Figure 7B:
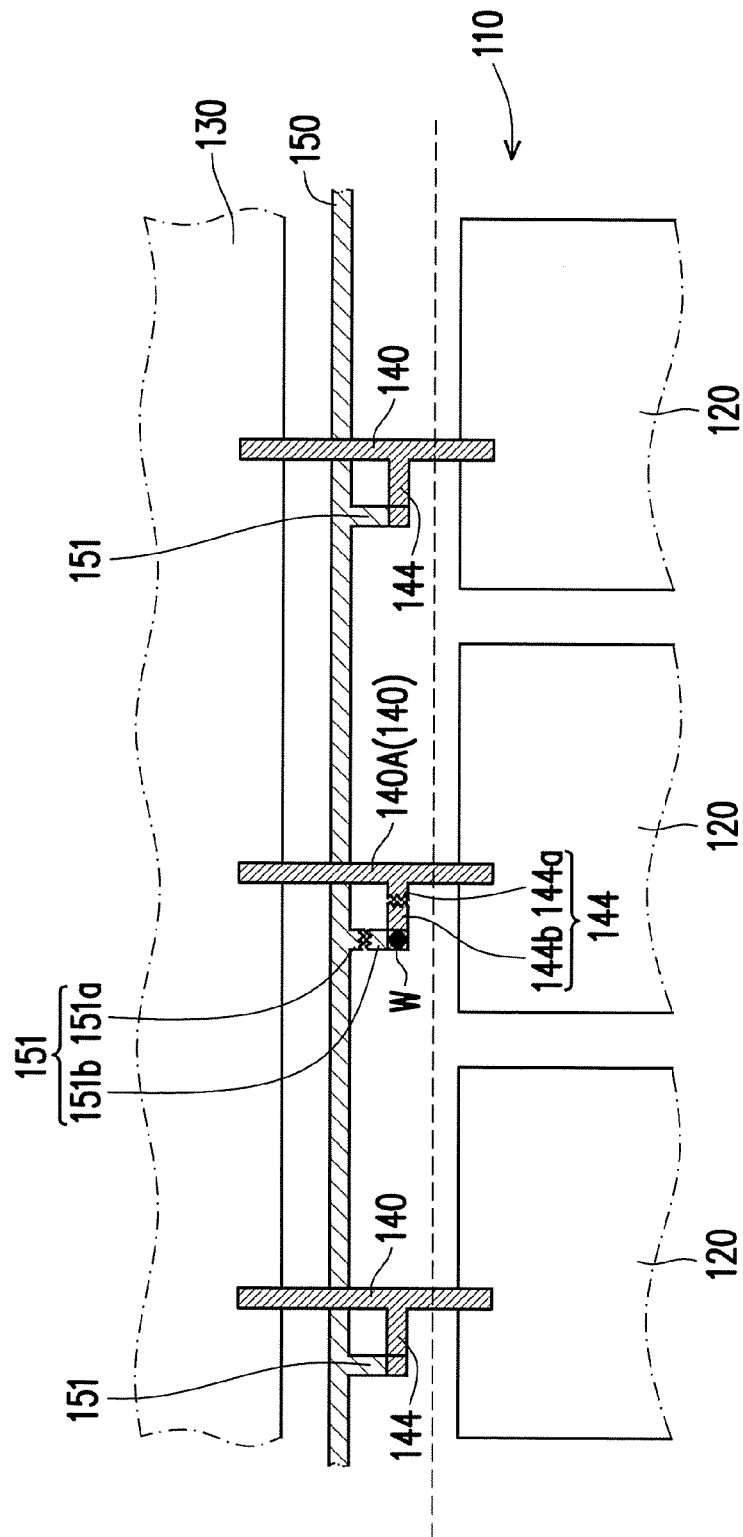

FIG. 6 is a flowchart illustrating a method for inspecting a location of a defect according to another embodiment of the invention. FIG. 7A and FIG. 7B are enlarged views of corresponding structures of an inspection method of the active device array substrate according to another embodiment of the invention. As shown in FIG. 7A, the active device array substrate of the present embodiment includes the display area 110, the pixel structures 120, the driving circuit 130, the control line 150 and the signal lines 140. A main difference between the present embodiment and the aforementioned embodiment is that one side of each signal line 140 has at least one first extending portion 144 which substantially protrudes toward the second extending portion 151, one side of the control line 150 has at least one second extending portion 151 which substantially protrudes toward the first extending portion 144, where at leas one of the first extending portions 144 is intersected to the corresponding second extending portion 151, and the aforementioned welding point W is formed at the location of the intersection after the laser welding. The first extending portions 144 in the figures all extend towards a same direction of the signal lines 140 (as shown in FIG. 7A, the first extending portions 144 all extend from the left side of the signal lines 140). However, the invention is not limited thereto, and the first extending portion 144 can extend from a different side of each of the signal lines 140, and the extending direction can be transverse or oblique. The second extending portions 151 may protrude toward the pixel structures 120, for example.

Moreover, in order to determine whether the design of the first extending portions 144 and the second extending portions 151 influences the GOA-type active device array substrate, a following experiment is carried out: a capacitance of a single signal line 140 with a side length of about 14 μm is about 630 pF, and it is assumed that a side length of a welding section formed by the first extending portion 144 and the second extending portion 151 is 8 μm, a generated capacitance thereof is about 0.01 pF, and compared to the capacitance of the aforementioned single signal line 140, an increase ratio of the capacitance added by the first extending portion 144 and the second extending portion 151 is about 0.001%, and such increase ratio is far less than a variation (about ±15%) of a chemical vapor deposition film. Therefore, according to the above experiment, it is known that the design of the first extending portions 144 and the second extending portions 151 does not influence the GOA-type active device array substrate.

The inspection method of the active device array substrate of the present embodiment is described below. Referring to FIG. 2, FIG. 6 and FIG. 7A, according to the step S10 of FIG. 2, first, the whole inspection is performed to the active device array substrate 100. Then, in the step S20, the tested signal line 140A with the defect is selected, and the above steps are the same to the aforementioned embodiment, so that details thereof are not repeated. Moreover, in the step S30, the tested signal line 140A is inspected. In the present embodiment, a method for inspecting the tested signal line 140A is shown in FIG. 6, and referring to step S31, the control line 150 and the tested signal line 140A are first conducted. In step S32, the test signal S is input to the tested signal line 140A from the control line 150, so as to determine the location of the defect according to the aforementioned infrared thermography detection, etc. Referring to FIG. 7A, different to the aforementioned embodiment, the test signal S on the control line 150 first flows through the second extending portion 151, and then flows through the welding point W, and finally flows into the tested signal line 140A to enter the display area 110.

After the location of the defect is determined, according to a step S33b of FIG. 6 and as shown in FIG. 7B, a method for isolating the control line 150 and the tested signal line 140A is to remove a part of the first extending portion 144 connected to the welding point W, so as to isolate the welding point W and the signal line 140A. Finally, a part of the second extending portion 151 connected to the welding point W is removed, so as to isolate the welding point W and the control line 150. However, the invention is not limited thereto, and a part of the second extending portion 151 can be first removed, and then a part of the first extending portion 144 is removed.

In other words, a structure of the active device array substrate repaired according to the present embodiment is as shown in FIG. 7B, the signal lines 140 include a target signal line 140A, the first extending portion 144 of the target signal line 140A is intersected with the corresponding second extending portion 151 to construct the welding point W. The welding point W is not electrically connected to the driving circuit 130 and the pixel structures 120, and the welding point W is respectively isolated to the target signal line 140 and the control line 150 through two disconnection portions. To be specific, referring to FIG. 7B, the signal lines 140 may include the target signal line 140A, the target signal line 140A further has a first main body portion 144a and a first disconnection portion 144b, and the control line 150 further has a second main body portion 151a and a second disconnection portion 151b. The welding point W is electrically isolated with the first main body portion 144a and the second main body portion 151a through the first disconnection portion 144b and the second disconnection portion 151b, respectively. According to the above description, compared to the aforementioned mending method of forming the connection line 160 (referring to FIG. 5C) through the laser chemical vapor deposition after removing a part of the tested signal line 140A, in the present embodiment, the conduction state between the tested signal line 140A and the control line 150 can be released by only removing the first disconnection portion 144b and the second disconnection portion 151b having the welding point W. Therefore, it is unnecessary to use a laser chemical vapor deposition machine to form the connection line 160 (referring to FIG. 5C).

Referring to FIG. 7B, in the target signal line 140A of the present embodiment, only a single first extending portion 144 is illustrated, and the control line 150 only has a corresponding single second extending portion 151. However, the invention is not limited thereto. For example, in response to different inspection or design requirements, in other embodiments, each of the signal lines 140 may have a plurality of first extending portions, and the control line 150 may have a plurality of second extending portions corresponding to the plurality of first extending portions. In an actual application, after one set of the first extending portion and the corresponding second extending portion is used to complete one inspection, the other first extending portions and the corresponding second extending portions can be further used according to an actual requirement to inspect the locations of the defects.

In summary, by inputting the test signal to the tested signal line from the control line, an effect of inspecting the location of the defect in the display area is achieved without making the test signal to flow through the GOA-type device array substrate, so as to avoid damaging the GOA-type active device array substrate, and improve a detection rate of the defect locations. Moreover, based on the characteristic that the tested signal line produce heat when the test signal flows through the tested signal line with the defect, an effect of producing an obvious infrared image during the inspection is achieved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An inspection method, adapted to detect a defect on an active device array substrate, wherein the active device array substrate comprises:
    a plurality of pixel structures, disposed in a display area;
    a driving circuit, disposed outside the display area;
    a plurality of signal lines, electrically connected to the driving circuit and the corresponding pixel structures; and
    a control line, intersected with the signal lines,
    the inspection method comprising:
    selecting a tested signal line from the signal lines;
    conducting the control line and the tested signal line;
    inputting a test signal to the tested signal line from the control line to determine a location of the defect; and
    isolating the control line and the tested signal line.

2. The inspection method as claimed in claim 1, wherein the step of selecting the tested signal line from the signal lines comprises:
    determining the tested signal line corresponding to the defect through a voltage imaging measurement method.

3. The inspection method as claimed in claim 1, wherein the step of inputting the test signal to the tested signal line to determine the location of the defect comprises:
    performing an infrared thermography detection to the active device array substrate, so as to determine the location of the detect according to obtained infrared thermography information.

4. The inspection method as claimed in claim 1, wherein the step of conducting the control line and the tested signal line comprises:
    welding an intersection of the control line and the tested signal line through laser, so as to form a welding point connecting the control line and the tested signal line.

5. The inspection method as claimed in claim 4, wherein after the location of the defect is determined, the step of isolating the control line and the tested signal line comprises:
    removing a part of the tested signal line connected at two opposite sides of the welding point to form:
        a first signal line segment, electrically connected to the driving circuit;
        a second signal line segment, electrically connected to the pixel structure; and
        a third signal line segment, having the welding point, and isolated to the first signal line segment and the second signal line segment.

6. The inspection method as claimed in claim 5, further comprising:
    forming a connection line electrically connected to the first signal line segment and the second signal line segment, wherein the connection line is isolated to the third signal line segment.

7. The inspection method as claimed in claim 4, wherein one side of the signal line has a first extending portion, one side of the control line has a second extending portion, and the first extending portion and the second extending portion are intersected to each other, so as to form the welding point after laser welding.

8. The inspection method as claimed in claim 7, wherein after the location of the defect is determined, the step of isolating the control line and the tested signal line comprises:
    removing a part of the first extending portion connected to the welding point to isolate the welding point and the signal line; and
    removing a part of the second extending portion connected to the welding point to isolate the welding point and the control line.

9. An inspection method, adapted to detect a defect on an active device array substrate, wherein the active device array substrate comprises:
    a plurality of pixel structures, disposed in a display area;
    a driving circuit, disposed outside the display area;
    a control line, located between the driving circuit and the display area;
    a plurality of signal lines, electrically connected to the driving circuit and the corresponding pixel structures, and intersected with the control line, wherein the signal lines comprise a target signal line, and the target signal line comprises:
        a first signal line segment, electrically connected to the driving circuit;
        a second signal line segment, electrically connected to the corresponding pixel structure;
        a third signal line segment, having a welding point connected to the control line, and respectively isolated to the first signal line segment and the second signal line segment; and
        a connection line, electrically connected to the first signal line segment and the second signal line segment, and isolated to the third signal line segment,
    the inspection method comprising:
    selecting a tested signal line from the signal lines;
    conducting the control line and the tested signal line;
    inputting a test signal to the tested signal line from the control line to determine a location of the defect; and
    isolating the control line and the tested signal line.

10. An inspection method, adapted to detect a defect on an active device array substrate, wherein the active device array substrate comprises:

a plurality of pixel structures, disposed in a display area;
a driving circuit, disposed outside the display area;
a control line, located between the driving circuit and the display area; and
a plurality of signal lines, electrically connected to the driving circuit and the corresponding pixel structures, and intersected with the control line, wherein one side of each of the signal lines has at least one first extending portion, one side of the control line has at least one second extending portion, one of the signal lines is defined as a target signal line, the first extending portion of the target signal line and the corresponding second extending portion are intersected to form a welding point, the target signal line further has a first main body portion and a first disconnection portion, the control line further has a second main body portion and a second disconnection portion, and the welding point is electrically isolated to the first main body portion and the second main body portion through the first disconnection portion and the second disconnection portion, respectively, the inspection method comprising:
selecting a tested signal line from the signal lines;
conducting the control line and the tested signal line;
inputting a test signal to the tested signal line from the control line to determine a location of the defect; and
isolating the control line and the tested signal line.

11. An inspection method, adapted to detect a defect on an active device array substrate, wherein the active device array substrate comprises:
a plurality of pixel structures, disposed in a display area;
a driving circuit, disposed outside the display area;
a control line, located between the driving circuit and the display area, and electrically isolated to the driving circuit; and
a plurality of signal lines, electrically connected to the driving circuit and the corresponding pixel structures, and intersected with the control line, wherein one side of each of the signal lines has at least one first extending portion, one side of the control line has at least one second extending portion, and at least one of the first extending portions is intersected with the corresponding second extending portion, the inspection method comprising:
selecting a tested signal line from the signal lines;
conducting the control line and the tested signal line;
inputting a test signal to the tested signal line from the control line to determine a location of the defect; and
isolating the control line and the tested signal line.

12. An inspection method, adapted to detect a defect on an active device array substrate, wherein the active device array substrate comprises:
a plurality of pixel structures, disposed in a display area;
a driving circuit, disposed outside the display area;
a control line, located between the driving circuit and the display area; and
a plurality of signal lines, electrically connected to the driving circuit and the corresponding pixel structures, and intersected with the control line, wherein one side of each of the signal lines has at least one first extending portion, one side of the control line has at least one second extending portion, wherein one of the signal lines is defined as a target signal line, the first extending portion of the target signal line and the corresponding second extending portion are intersected to form a welding point, and the welding point is not electrically connected to the driving circuit, the inspection method comprising:
selecting a tested signal line from the signal lines;
conducting the control line and the tested signal line;
inputting a test signal to the tested signal line from the control line to determine a location of the defect; and
isolating the control line and the tested signal line.

* * * * *